(12) United States Patent
Corbeil

(10) Patent No.: US 6,863,142 B2
(45) Date of Patent: Mar. 8, 2005

(54) MOTORCYCLE TRACTION ACCESSORY DEVICE

(76) Inventor: Paul Corbeil, 3355 Chemin St. Pasca, Saint-Pascal-Baylon, Ontario (CA), KOA 3NO ( * ) Notice: Subject to any disclaimer, the term of this patent is extended or adjusted under 35 U.S.C. 154(b) by 0 days.

(21) Appl. No.: 10/373,486

(22) Filed: Feb. 24, 2003

(65) Prior Publication Data

US 2004/0163857 A1 Aug. 26, 2004

(51) Int. Cl.$^7$ .............................................. B62M 27/02
(52) U.S. Cl. ....................................... 180/185; 305/193
(58) Field of Search ................................ 180/183, 184, 180/185, 186, 190, 9.21, 9.25, 9.26, 9.34, 9.38, 194; 305/116, 193; 280/8, 13

(56) References Cited

U.S. PATENT DOCUMENTS

| 1,701,212 A | * | 2/1929 | Nickerson ....................... 280/8 |
| 1,901,212 A | * | 3/1933 | Nickerson ...................... 219/103 |
| 3,157,913 A | * | 11/1964 | Hubert ....................... 180/9.25 |
| 3,158,220 A | * | 11/1964 | Griffith ....................... 180/9.25 |
| 3,336,994 A | * | 8/1967 | Pederson ..................... 180/9.62 |
| 3,872,938 A | * | 3/1975 | DeGroot ....................... 180/185 |
| 4,488,616 A | | 12/1984 | Harris |
| 4,534,437 A | | 8/1985 | Howerton et al. |
| 4,635,740 A | | 1/1987 | Krueger et al. |
| 4,699,229 A | | 10/1987 | Hirose et al. |
| 5,203,424 A | | 4/1993 | Gogo et al. |
| 5,228,528 A | | 7/1993 | Sauve |
| 5,474,146 A | | 12/1995 | Yoshioka et al. |

FOREIGN PATENT DOCUMENTS

| CA | 458162 | 7/1949 |
| CA | 1041147 | 10/1978 |
| CA | 1219621 | 3/1987 |
| CA | 2002997 | 6/1990 |
| CA | 2032462 | 6/1991 |
| CA | 2114150 | 7/1995 |
| CA | 2154729 | 1/1997 |

* cited by examiner

*Primary Examiner*—Anne Marie Boehler
(74) *Attorney, Agent, or Firm*—Jackson Walker LLP

(57) ABSTRACT

Disclosed is a traction device for detachable association with a motor bike for winter driving, the bike having a rear wheel assembly including an axle and a rubber tire supported by laterally spaced bike struts. The traction device comprises laterally spaced opposed side strut assemblies each having a forward end and rearward end, a traction wheel assembly and an endless track. The side strut assemblies each include means adapted to pivotally connect the forward end of each of the strut assemblies to the bike adjacent the rear axle of the bike wheel assembly with the strut assemblies extending rearwardly of the bike, The traction wheel assembly is rotatably supported by the rear ends of the strut assemblies. The endless track has means for cooperating with the rubber tire of the bike and the traction wheel assembly to maintain the endless track centered on the rubber tire and the traction wheel assembly.

4 Claims, 3 Drawing Sheets

MOTORCYCLE TRACTION ACCESSORY DEVICE

FIELD OF THE INVENTION

The invention relates to motorcycles and more particularly to a traction device for winter driving of motorcycles.

BACKGROUND OF THE INVENTION

U.S. Pat. No. 5,474,146 granted Dec. 12, 1995 to Yoshioka et al relates to a snow vehicle and more particularly to a vehicle of the saddle-riding type having a rear traction device of the endless belt variety.

U.S. Pat. No. 4,534,437 granted Aug. 13, 1985 to Howerton relates to a snow track belt for a motorcycle wherein the track belt device is associated with a rear wheel of the motorcycle without significant modification to the motorcycle.

Canadian Patent 458,162 to Cote relates to a bicycle modified for winter driving including a traction device to which the bike chain is connected.

Canadian Patent Application File Nos. 2,114,150 and 2,154,729 are also directed to modifying bicycles for winter driving, both traction devices being associated with the rim of the rear wheel, the tire being removed.

None of the prior art noted above provides a simple, but expedient means for providing a traction device which is mounted in association with the rear wheel of a motorcycle wherein the rear tire remains on its rim and the traction belt is associated with it in a simple but effective manner, to enable ease of conversion to winter driving

SUMMARY OF THE INVENTION

Accordingly, there is a need for a simple traction device for conversion to winter driving which can be assembled with a motorcycle without removing the rear tire from its rim and yet provide good traction and allows flexibility to the driver to lean into corners when steering.

The invention in one broad aspect provides a traction device for detachable association with a motor bike for winter driving, the bike having a rear wheel assembly including an axle and a rubber tire supported by laterally spaced bike struts. The traction device comprises laterally spaced opposed side strut assemblies each having a forward end and rearward end, a traction wheel assembly and an endless track. The side strut assemblies each include means adapted to pivotally connect the forward end of each of the strut assemblies to the bike adjacent the rear axle of the bike wheel assembly with the strut assemblies extending rearwardly of the bike. The traction wheel assembly is rotatably supported by the rear ends of the strut assemblies. The endless track has means for cooperating with the rubber tire of the bike and the traction wheel assembly to maintain the endless track centered on the rubber tire and the traction wheel assembly.

The motorcycle can be further modified by attaching a ski to the front wheel, allowing for even more off-road riding in looser snow conditions.

DESCRIPTION OF THE PREFERRED EMBODIMENT

Figure 1:
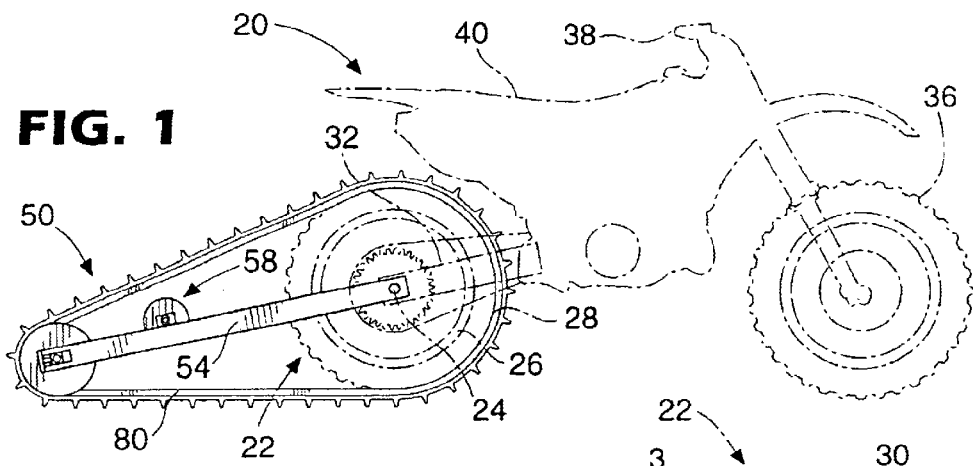
FIG. 1 is a side view of a motor-cross type of motorcycle showing the inventive traction device or accessory for winter riding attached thereto.
Figure 2:
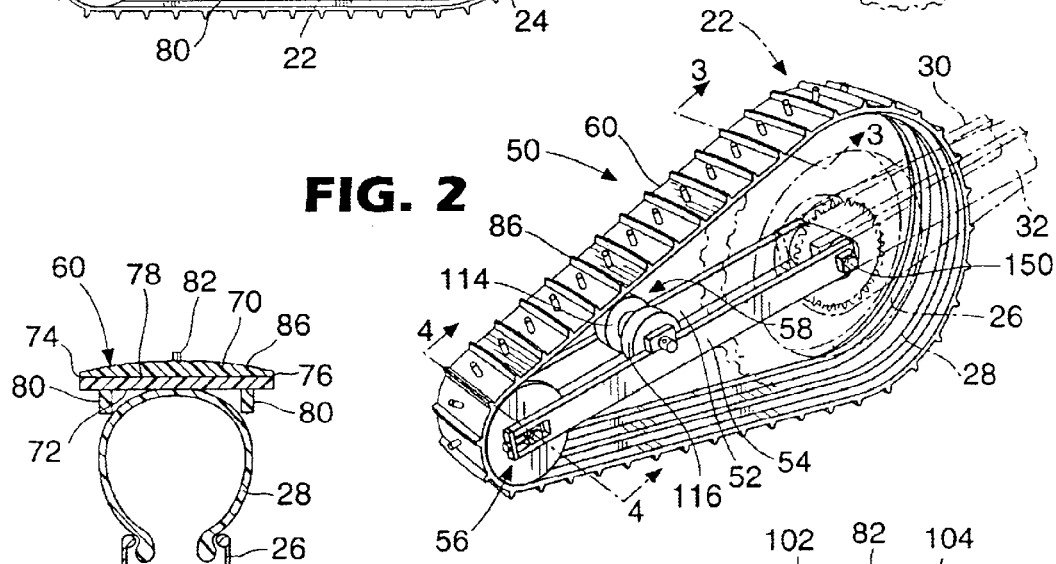
FIG. 2 is a rear perspective view of the traction device but omitting the front portion of the cycle for the purposes of clarity.

Turning to FIGS. 1 and 2, a motocross type of motorcycle 20 of standard construction has rear wheel assembly 22 including axle 24, rim 26 and tire 28 and support struts 30, 32, front wheel 36, handlebars 38 and seat 40. The traction device 50 includes rearwardly extending struts 52, 54, extending rearwardly from the rear axle assembly 22 of the bike 20. Traction device 50 also includes rear traction wheel assembly 56, weights 58, and track 60.

Figure 3:
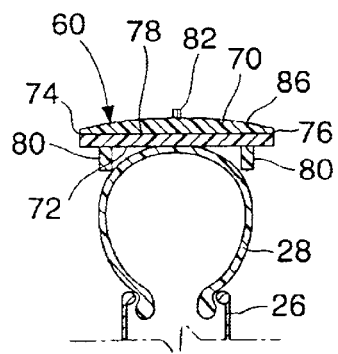
FIG. 3 is a sectional view along line 3—3 of FIG. 2.

Turning to FIG. 3, a sectional view of track or belt 60, belt 60 is constructed of rubber like material, similar to that used in snowmobile tracks and has upper or outer surface 70, lower or inner surface 72 and laterally opposed side edges 74, 76. Embedded in track 60 and spaced at longitudinal intervals along the belt are laterally extending reinforcing plastic bars or rods 78 which provide rigidity to the track 60 and prevent the track from flexing too much into a curved form about tire 28. Laterally spaced protrusions or nubs 80 extend downwardly from inner surface 72 of belt 60 and prevent the track from running off tire 28 and provide a centering means for maintaining track 60 in appropriate alignment with the tire 28 and with the rear traction wheel assembly 56. Spikes 82 in track 60 extend outwardly to enhance traction on ice or hard snow. Any number of spikes may be used and they are fastened to track 60. Track 60 also has laterally extending longitudinally spaced convex shaped ribs 86 extending outwardly of the outer surface 70.

Figure 4:
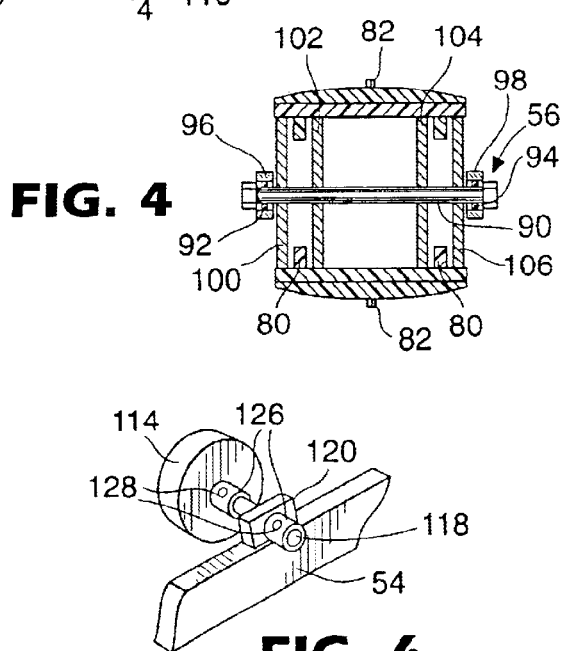
FIG. 4 is a sectional view along line 4—4 of FIG. 2.

Turning to FIG. 4, being a partial sectional view of the rear traction wheel assembly 56, the assembly includes a shaft 90 supported for rotation on bearings 92, 94 which are carried by the rear end 96, 98 of struts 52, 54. Wheel discs 100, 102, 104, 106 are secured to shaft 90 at laterally spaced intervals so that nubs or protrusions 80 run within the spaces between the outer adjacent discs 100, 102 and 104, 106. It will be appreciated that outer ends of shaft 90 could be secured to blocks supported by the struts 52, 54 and the wheel discs individually journalled on the shaft. In this alternative embodiment, spacers between the wheel discs to keep them in appropriate laterally spaced relationship are preferred.

Figure 5:
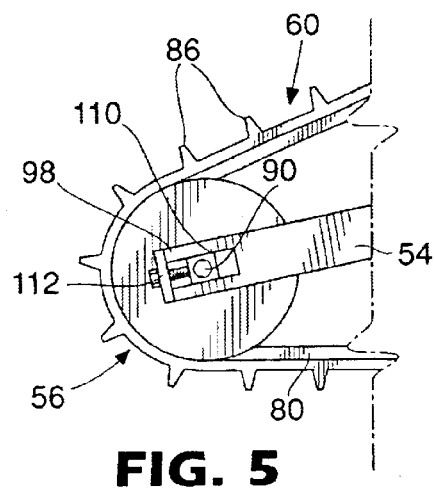
FIG. 5 is a perspective view of the connection of the weight to the strut.

FIG. 5 is a schematic view of the rear wheel assembly from the side showing the rear end 98 of strut 54 bifurcated with a square bearing block 110 mounting bearing 94 is slidable within the bifurcation. Tension on the belt 60 can be adjusted by a block and screw mechanism 112 cooperating with the ends of the bifurcation and the bearing block 110 in known manner.

Figure 6:
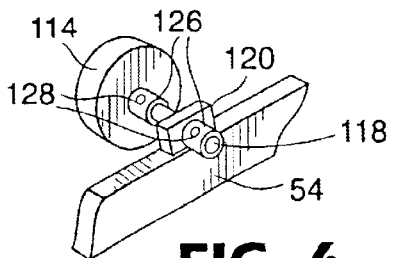
FIG. 6 is a side view of the rear traction wheel and support strut.

Returning to FIGS. 1, 2 and 6, disc weights 114, 116 are held by rod 118 which is mounted between blocks 120, 122, which blocks are secured to struts 52, 54 intermediate the ends thereof so that the weights do not interfere with travel of the track 60. The weights may be selected as circumstances dictate, but are sufficient to maintain and bias the track 60 in contact with the ground, yet will permit pivotal or rotational movement of the struts 52, 54 about the axle 24 of the motorcycle. Weights are secured to rod 118 and rod 118 to blocks 120, 122 by collar 126/Allen screw 128 mechanisms, one of which are shown in FIG. 6 wherein the rod 118 and weights 114, 116 can be axially removed from the block. Any means of detachably mounting the weights to the struts 52, 54 is appropriate, provided the weights do not slip from side to side on rod 118.

Figure 7:
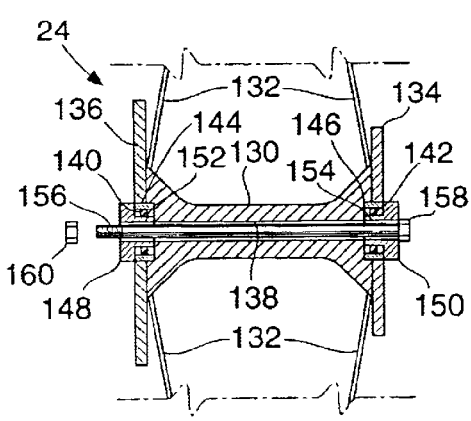
FIG. 7 is an exploded view of the rear axle of the cycle according to the prior art.

FIG. 7 provides a sectional view through a typical rear axle assembly 24 of a motorcycle (prior art). Assembly 24 has hub 130 from which spokes 132 extend outwardly to support the rim 24 (FIGS. 1 and 2). Secured to hub 130 is rear chain sprocket 134 and disc brake plate 136. Hub 130 is tubular with a central bore 138 and is supported by bearings 140, 142 which are housed in recesses 144, 146 of hubs 130. The rear ends 148, 150 of struts 30, 32 support the hub 130 on shoulders 152, 154 and bolt 156 with head 158 and nut 160 extends through ends 148, 150 and hub bore 130 to secure ends 148, 150 in proper spaced relationship to support the hub for rotation. Various washers have been omitted for clarity.

Figure 8:
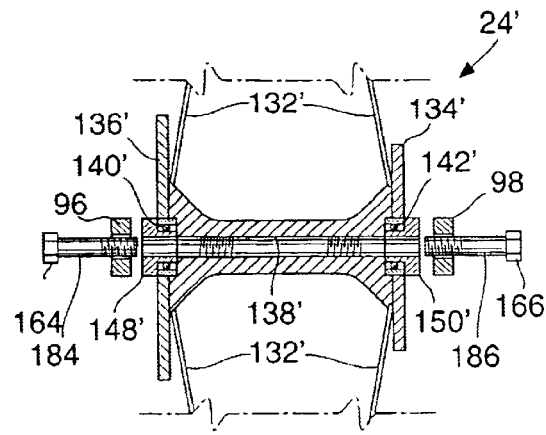
FIG. 8 is an exploded view of the rear axle of the bike with the additional traction support arm bracket in accordance with the invention.

Turning to FIG. 8, a view similar to that of FIG. 7, FIG. 8 illustrates the rear axle assembly 24' modified to enable securement of the rear ends 96, 98 of traction assembly struts 52, 54. However, depending on the bike to which the device is to be used, axle assembly 24' may be modified by lengthening bolt 156 or preferably, as herein shown, using two threaded bolts 164, 166 and internally threading bore 138' at 168, 170 respectively. Traction device strut ends 96, 98 are located outwardly of rear axle supporting strut ends 148', 150'. Suitably washers and bearings associated with strut ends 96 and 98 and its connection to the rear axle assembly through bolts 164, 166 have not been shown.

Figure 9:
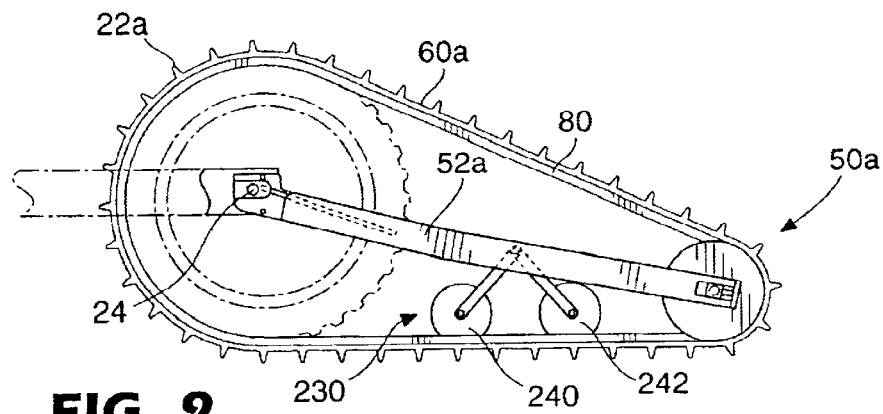
FIG. 9 is a side view of a modified embodiment of the invention.
Figure 10:
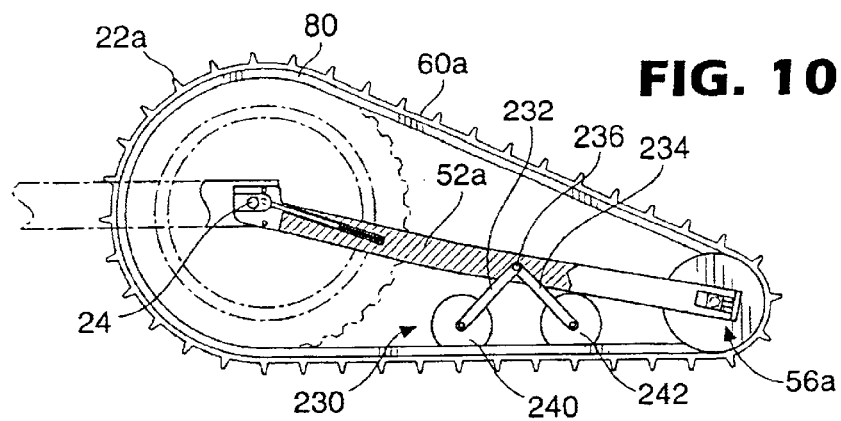
FIG. 10 is a further side view showing the embodiment of FIG. 8.
Figure 11:
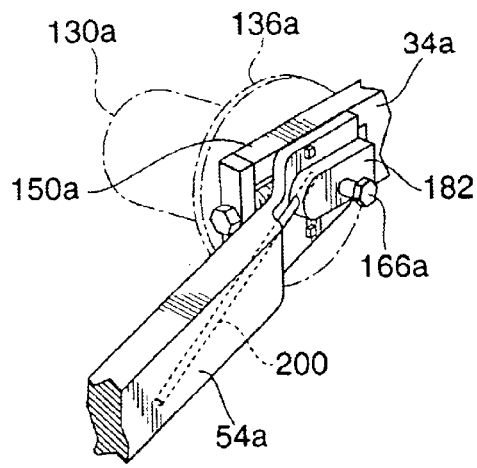
FIG. 11 is a perspective view of part of the rear axle assembly and struts.
Figure 12:
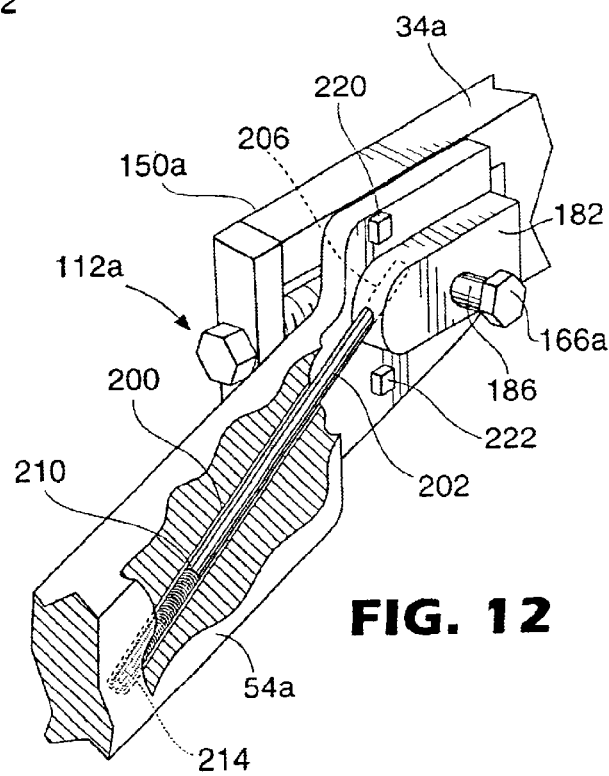
FIG. 12 is an enlarged perspective view of the traction assembly strut and the spring biased feature.

Turning to FIGS. 9 and 10, a second embodiment of the traction device is shown with respect to maintaining a downward bias to the traction device. In place of the weights 114, 116 to keep the track assembly biased and in contact with the ground, there are provided spring loaded struts 52a and 54a. As shown in FIGS. 9–12, block 182, only one side is shown, the other side being a mirror image thereof is splined to or otherwise secured to shank 186 of bolt 166a for non-rotation therewith. Pivotally located between block 182 and end 150 of strut 34a and pivotal on shanks 164, 166 are struts 52a, 54a. The strut 54a has an internal bore 200, angled as shown in FIGS. 10, 11 and 12. Within bore 200 is rod 202 having an end 204 extending within offset recess 206 of block 182 and the opposite end 210 within bore 200 in contact with spring 214, placing spring 214 within bore 200 under compression. The angle of bores 200, and the offset of recess 206 from the axis of hub 130a and the placement of spring 214 under compression, bias or tending to force rotation of and strut 54a in the direction of the ground which will maintain the traction assembly in contact with the ground. However, there is still limited rotational or pivotal movement of the traction assembly provided about bolt 166a with this modified embodiment, Limit blocks 220, 222 which prevent over-rotation of strut 54a either upwardly or downwardly, engage blocks 182 to limit rotation. It will be appreciated that limit blocks could be placed on the inside of strut 54a to cooperate with upper and lower portions of the bifurcated end 150a of strut 34a. Further, the spring loaded mechanism of strut 54a including rod 202 and spring 214 could be modified so that it is associated with end 150a of strut 34a, a block like 182 being secured to end strut 150a.

With the embodiment having spring loaded or biased struts 52a, 54a, the weights 114, 116 are no longer required. Preferably with this modified spring biased embodiment a traction idler assembly 230 as shown in FIGS. 9 and 10, is provided. Each assembly 230 has two right angled support arms 232, 234 pivoted at 236 to the struts 52a, 54a at the right angle of the arms, with idler rollers 240, 242 rotatably supported at the ends of the support arms 232, 234, respectively. The idler assembly 230 assists in maintaining track 60a in contact with the ground.

Figure 13:
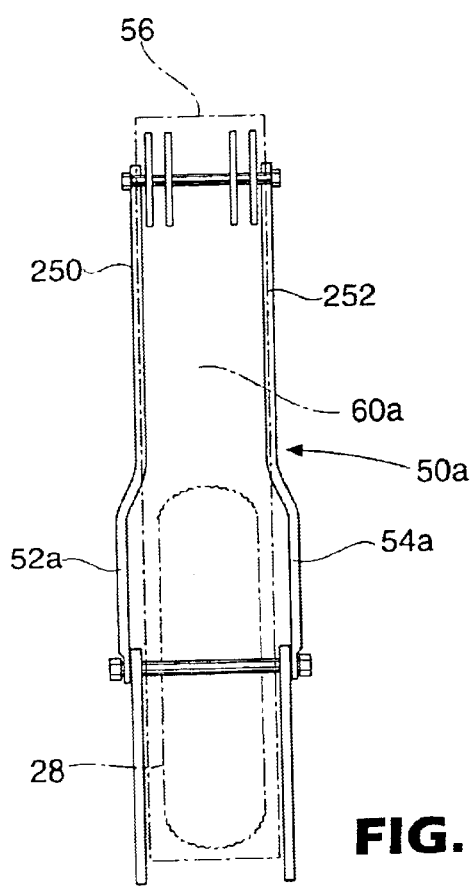
FIG. 13 is a top view of a modification of the configuration of the traction assembly strut.

FIG. 13 shows a top view of the traction assembly 50a illustrating a preferred form of the struts 52a, 54a wherein they are configured so the rear portions thereof 250, 252 are substantially within the lateral area of the track 60a whereby the struts 52a, 54a will interfere less with movement of the assembly 50a downwardly in soft snow for contact with more solid ground for traction.

Various modifications to the invention over that illustrated herein will be appreciated by those skilled in the art and which fall within the scope of the invention.

The embodiments of the invention in which an exclusive property or privilege is claimed are defined as follows:

1. A traction device for detachable association with a motor bike for winter driving, said bike having a rear wheel assembly including an axle and a rubber tire supported by laterally spaced bike struts, said traction device comprising, laterally spaced opposed side strut assemblies each having a forward and rearward end, a traction wheel assembly and an endless track, said side strut assemblies each including means adapted to pivotally connect the forward end of each of said strut assemblies to said bike adjacent the rear axle of said bike wheel assembly with the strut assemblies extending rearwardly of said bike, said traction wheel assembly being rotatably supported by the rear ends of said strut assemblies, said endless track having means for cooperating with the rubber tire of said bike and said traction wheel assembly to maintain said endless track centered on said rubber tire and said traction wheel assembly;

said endless track comprising a reinforced material having inner and outer surfaces, said outer surface having outwardly convex ribs and said inner surface having inwardly extending laterally spaced protrusions which cooperate with outer sides of said tire to maintain said track centered on said tire;

said traction assembly comprising a plurality of laterally spaced wheel discs rotatably mounted to the rear end of said device between said side struts, said wheel discs being spaced whereby said laterally spaced inwardly extending protrusions travel between two adjacent wheel discs so that said track is maintained in centered contact with said traction wheel assembly.

2. The traction device of claim 1 further comprising means to bias said traction device downwardly into contact with the ground.

3. The traction device of claim 2 wherein said biasing means are weights supported between said device side struts intermediate said bike rear wheel assembly and said traction wheel assembly.

4. The traction device of claim 2 wherein said biasing means comprise off center spring biased rods between said device side struts and block means associated with said bike rear wheel assembly.

* * * * *